(12) United States Patent
Reinbold et al.

(10) Patent No.: US 12,333,060 B2
(45) Date of Patent: Jun. 17, 2025

(54) ATTENDANCE RECORDING TERMINAL AND METHOD OF OPERATION TO PROTECT AGAINST ACTS OF SABOTAGE

(71) Applicant: dormakaba EAD GmbH, Villingen-Schwenningen (DE)

(72) Inventors: Andreas Reinbold, Villingen-Schwenningen (DE); Martin Ruof, Villingen-Schwenningen (DE)

(73) Assignee: DORMAKABA EAD GMBH, Villingen-Schwenningen (DE)

( * ) Notice: Subject to any disclaimer, the term of this patent is extended or adjusted under 35 U.S.C. 154(b) by 241 days.

(21) Appl. No.: 18/106,808

(22) Filed: Feb. 7, 2023

(65) Prior Publication Data
US 2023/0252194 A1    Aug. 10, 2023

(30) Foreign Application Priority Data
Feb. 10, 2022    (EP) .................................... 22156207

(51) Int. Cl.
*G06F 21/86*    (2013.01)
(52) U.S. Cl.
CPC ................... *G06F 21/86* (2013.01)

(58) Field of Classification Search
None
See application file for complete search history.

(56) References Cited

FOREIGN PATENT DOCUMENTS

| DE | 102016008254 A1 | 1/2018 | |
|---|---|---|---|
| GB | 2540173 A | 1/2017 | |
| WO | 8402786 A1 | 7/1984 | |
| WO | WO-2020193576 A1 * | 10/2020 | ............... G01S 1/02 |

* cited by examiner

*Primary Examiner* — Cai Y Chen
(74) *Attorney, Agent, or Firm* — CANTOR COLBURN LLP

(57) ABSTRACT

A computer-implemented method for the protected operation of an attendance recording terminal, in particular a time recording terminal, for recording attendance information of a person on the basis of an action of the person, includes the following steps:
  detecting a physical external influence on the attendance recording terminal;
  checking whether the physical external influence fulfills a predefined trigger condition; and
  triggering at least one protective function if the check results in the external physical influence fulfilling the trigger condition. A corresponding attendance recording terminal is related.

19 Claims, 5 Drawing Sheets

ATTENDANCE RECORDING TERMINAL AND METHOD OF OPERATION TO PROTECT AGAINST ACTS OF SABOTAGE

CROSS-REFERENCE TO RELATED APPLICATIONS

The present application claims priority to European patent application no. 22156207.7, filed on 10 Feb. 2022, the contents of which are herein incorporated by reference in their entirety.

TECHNICAL FIELD

The present disclosure relates to a computer-implemented method for the protected operation of an attendance recording terminal, in particular a time recording terminal, for recording attendance information of a person on the basis of an action of the person. Furthermore, the disclosure relates to an attendance recording terminal, in particular a time recording terminal, for recording attendance information of a person on the basis of an action of the person. Lastly, the disclosure relates to a computer program for execution on a processor of an attendance recording terminal and a computer-readable medium with such a computer program.

BACKGROUND

Attendance recording terminals are particularly widespread in the world of work for recording the attendance of an employee. Attendance recording terminals are often found in office buildings, factory buildings or even hospitals. A system is provided by means of the attendance recording terminals, which allows electronic recording and storage of employee attendances. In the case of a time recording terminal, the terminal is also used to record and store the working hours completed. In general, in this context, the attendance information of a person is mentioned, which person would like to clock in for work via the attendance recording terminal or, for example, log out for a break or at the end of the working day or clock out of the system.

Attendance recording terminals allow a point to be provided for people to interact centrally, for example at a point in the entrance area of an office building or on every floor or in every department of a building/company, via which the clocking processes can be easily implemented. A central system is then available to the employer, for example via the memory management unit of the attendance recording terminal, via which the employer can track the attendance information of the individuals without significant effort.

Since the location for the terminals is often freely accessible, so that a person can identify themselves there and clock in to work, for example, attendance recording terminals also run the risk of being manipulated by access from outside. For example, acts of sabotage carried out on terminals can aim to destroy the terminal. However, a possible act of sabotage can also include stealing or sabotaging sensitive data on the terminal.

SUMMARY

Against this background, the present disclosure provides an improved computer-implemented method for operating an attendance recording terminal and a corresponding attendance recording terminal, which ensures improved protection against the consequences of an external sabotage attempt. Furthermore, the present disclosure provides a corresponding computer program in order to improve protection against acts of sabotage.

According to the disclosure, the mentioned advantages are achieved by providing the proposed computer-implemented method for operating an attendance recording terminal, and by the proposed attendance recording terminal, in particular time recording terminal, for recording attendance information of a person on the basis of an action of the person, and by the proposed computer program with the features of the corresponding independent claims. In addition, preferred embodiments can be found in the dependent claims and the description.

In detail, a computer-implemented method is proposed for the protected operation of an attendance recording terminal for recording attendance information of a person on the basis of an action of the person. The attendance recording terminal can in particular be a time recording terminal. The method comprises the following steps:
  a) detecting a physical external influence on the attendance recording terminal;
  b) checking whether the physical external influence fulfills a predefined trigger condition;
  c) triggering at least one protective function if the check results in the external physical influence fulfilling the trigger condition.

With regard to the attendance recording terminal, an attendance recording terminal for recording attendance information of a person on the basis of an action of the person is specifically provided, wherein the attendance recording terminal can in particular be a time recording terminal. The attendance recording terminal comprises:
  a control unit; and
  a monitoring apparatus for detecting a physical external influence on the attendance recording terminal;
  wherein the control unit is configured in such manner that:
  A) a physical external influence detected by means of the monitoring apparatus is checked to determine whether it fulfills a predefined trigger condition; and
  B) at least one protective function is triggered if the check in step A) results in the detected external physical influence fulfilling the trigger condition.

The features and advantages described above and below within the scope of the proposed attendance recording terminal can be transferred accordingly to the proposed computer-implemented method for operating an attendance recording terminal. The computer-implemented method can be configured for operating that proposed and described attendance recording terminal. The proposed and described attendance recording terminal is in turn preferably configured for carrying out the proposed computer-implemented method for operating an attendance recording terminal. In this respect, the features and specific advantages relating to the attendance recording terminal or the method for operating the attendance recording terminal are generally only simply described together. Features described in connection with the device of the attendance recording terminal can be included in claims relating to the computer-implemented method accordingly and vice versa.

A significant advantage of the present disclosure is that in the attendance recording terminal (in short: terminal), a monitoring function is implemented, which identifies a possible act of sabotage early and automatically. Specific protective functions can then advantageously run in order, for example, to exert a deterrent effect on the person carrying out the sabotage and thus even end the act of sabotage early. The tracking of the act of sabotage can also be carried out advantageously, since data about the person carrying out the sabotage (e.g. photos) can be collected at an early stage via a protective function, for example, or even by a central location being informed directly about the attempted act of sabotage. A further advantage can be that a corresponding protective function triggers a deletion process for the sensitive data on the terminal, so that the attempted act of sabotage can at least not lead to theft or manipulation of sensitive data.

Possible acts of sabotage are defined via the predefined trigger conditions. In principle, the sabotage can be an attempted sabotage of the hardware, but it can also be an attempted software sabotage, such as a hacker attack. A simple example of an act of sabotage can also be repeatedly entering an incorrect PIN. It may be necessary for a user to identify themselves via their personal PIN in order to interact with the terminal. However, if this PIN has been entered incorrectly three times, for example, an act of sabotage can be assumed and the user can be blocked from interacting at least briefly in the terminal. In this case, the physical external influence is the entry of the PIN of the people interacting with the terminal. In the case described, the predefined trigger condition is that the PIN must not be entered incorrectly three times in succession. However, if that trigger condition is fulfilled, i.e. the PIN has been entered incorrectly three times in a row, the protective function is triggered in the form of blocking the interacting user.

The monitoring apparatus is used to detect the external physical influence on the attendance recording terminal. The monitoring apparatus can be a physical component of the terminal, i.e. integrated into a common housing, and detection can therefore be carried out by the terminal itself, for example via built-in acceleration sensors, temperature sensors, cameras, etc. However, the monitoring apparatus can alternatively or additionally be provided externally, in the form of a third-party device, so that the physical external influence can be detected by this third-party device. This can, for example, be a camera that is placed outside the terminal, for example suspended opposite the terminal. The third-party device can communicate directly with the terminal (in a wired or wireless manner) or communicate with a server (in a wired or wireless manner), wherein the server in turn can communicate with the terminal (in a wired or wireless manner).

The checking step can be carried out by the terminal (e.g. by a control unit of the attendance recording terminal in connection with the monitoring apparatus) or by a server (in communicative connection with the terminal). The triggering step can also be carried out either by the terminal (e.g. by a control unit of the attendance recording terminal in connection with components that trigger a protective function) or by a signal or command from a server (in communicative connection with the terminal).

Trigger threshold values can advantageously be used when checking whether or not a predefined trigger condition is fulfilled. Once the trigger threshold value has been exceeded, the predefined trigger condition is then fulfilled and it can then be assumed that at least one supposed act of sabotage is present, so that a protective function is triggered as proposed. The trigger threshold value can be, for example, a force application threshold value or a temperature threshold value (both described in more detail later) or another suitable trigger threshold value.

The trigger threshold value can advantageously also contain a condition that states that it must be a certain time of day or time. For example, the trigger condition can provide and accordingly be stored in the trigger threshold value as a necessary condition that a time outside of working hours and/or outside of building opening hours must be present. As a result, the check for acts of sabotage or the reduction of negative effects is focused precisely on sensitive times when acts of sabotage are to be expected to a greater extent.

Additionally or alternatively, it can be provided that a different trigger condition or a different trigger threshold value is present depending on the time. The level or the type of the trigger condition or of the trigger threshold value can be adjusted. For example, outside of working hours or building opening hours, a force application threshold value can be set lower from the trigger threshold value than during working hours or building opening hours, because the terminal is operated regularly, especially during working hours or building opening hours, so that certain forces applications caused by regular use of the terminal are usually tolerated by the system. Especially at night, the tolerance can be set lower and more sensitively, and a lower force application threshold value can already be interpreted as an act of sabotage. A temperature threshold value can in turn be set lower outside of working hours or building opening hours from trigger threshold value than during working hours or building opening hours, because for example, especially at night it is usually colder than during working hours or building opening hours.

According to one embodiment of the computer-implemented method for operating an attendance recording terminal, it is proposed that method steps a) to c) only take place during at least one predefined period of time.

According to a further embodiment of the attendance recording terminal, it is proposed that the monitoring apparatus is configured in such manner that the detection of the external physical influence only takes place during at least one predefined period of time.

Alternatively or additionally, the control unit can be configured in such manner that steps A) and B) take place in the proposed attendance recording terminal only during at least one predefined period of time.

If the functions for identifying acts of sabotage and triggering protective functions to reduce negative effects from those acts of sabotage are only temporarily, i.e. not permanently, executed, the attendance recording terminal can advantageously be operated in a more energy-saving manner. In particular, the steps mentioned can be carried out, for example, exclusively at night and/or exclusively outside of working hours and/or exclusively during the day when it is dark. Then the protection against acts of sabotage is advantageously increased in times of particular danger.

According to a further embodiment of the computer-implemented method for operating an attendance recording terminal, it is proposed that the external physical influence is detected in method step a) by means of at least one acceleration sensor.

In particular, during the checking according to method step b), a detected acceleration sensor signal can be compared with a predefined force application threshold value.

According to a further embodiment of the attendance recording terminal, it is proposed that the monitoring apparatus has at least one acceleration sensor for detecting the physical external influence.

In this context, a detected acceleration sensor signal can be compared with a predefined force application threshold value, in particular during the checking according to step A) in the proposed attendance recording terminal.

One acceleration sensor as well as a plurality of acceleration sensors can be provided.

Using an acceleration sensor, acts of sabotage in particular, which are characterized by force applications such as kicks, impacts or mechanical manipulation attempts, can be detected quickly and reliably.

According to a further embodiment of the computer-implemented method for operating an attendance recording terminal, it is proposed that the external physical influence is detected in method step a) by means of at least one temperature sensor.

In particular, a detected temperature can be compared with a temperature threshold value during the checking according to method step b).

According to a further embodiment of the attendance recording terminal, it is proposed that the monitoring apparatus has at least one temperature sensor for detecting the external physical influence.

A recorded and detected temperature can be compared with an expected temperature threshold value in particular during the checking according to step A) in the proposed attendance recording terminal.

In the proposed method or in the proposed attendance recording terminal, the temperature threshold value can preferably be determined as a function of an ambient temperature.

One temperature sensor as well as a plurality of temperature sensors can be provided.

The temperature threshold value can be increased or decreased depending on the ambient temperature. Either a recorded ambient temperature (via a thermometer) or an ambient temperature stored in the system (which can be called up via an online connection to the weather service, etc.) can be included.

The temperature sensor can be configured in such manner that it can switch off when a predefined ambient temperature is exceeded. In this way, it can be avoided that misinterpretations take place or false alarms are triggered on particularly warm days.

According to a further embodiment of the computer-implemented method for operating an attendance recording terminal, it is proposed that the external physical influence is detected in method step a) by means of at least one camera.

In particular, camera tracking can take place during the detection according to method step a) and a detected movement pattern of a person interacting with the attendance recording terminal can be compared with a predefined movement pattern.

According to a further embodiment of the attendance recording terminal, it is proposed that the monitoring apparatus has at least one camera for detecting the physical external influence.

In particular, during the checking according to step A), camera tracking can take place in the proposed attendance recording terminal and a detected and recorded movement pattern of a person interacting with the attendance recording terminal can be compared with a predefined movement pattern of a person interacting with the attendance recording terminal.

One camera as well as a plurality of cameras can be provided.

The camera or at least one camera of the plurality of cameras can either be integrated into the attendance recording terminal, i.e. a physical component in a common housing, for example, or it can also be designed separately. When designed separately, the camera can then be configured to communicate directly with the attendance recording terminal (in a wired or wireless manner) or be in communicative connection with a server, which server in turn is communicatively connected to the attendance recording terminal.

According to a further embodiment of the computer-implemented method for operating an attendance recording terminal, it is proposed that the protective function in method step c) comprises recording at least one photo by means of a camera. In this case, in particular, an illumination value of a display of the attendance recording terminal can be increased for recording the photo.

In this way, important information about the sabotage attempt can be collected, such as a photo of the sabotaging person. Increasing the illumination value of the display can increase the quality of the photo in terms of recognizable information content, even in the dark.

Alternatively or additionally, as part of the computer-implemented method for operating an attendance recording terminal, it can be provided that the protective function in method step c) comprises recording at least one sound recording by means of a microphone. Valuable information about the sabotage attempt can advantageously also be collected in this way.

Alternatively or additionally, as part of the computer-implemented method for operating an attendance recording terminal, it can be provided that the protective function in method step c) comprises outputting at least one acoustic signal. Advantageously, the sabotage attempt can thus be directly disrupted and possibly prevented, since the sabotaging person can be deterred by the warning signal. In addition, bystanders or people in the vicinity can be informed of the sabotage attempt in this way and further countermeasures can be initiated.

According to a further embodiment of the attendance recording terminal, it is proposed that the control unit (21) be configured in such manner that the protective function in step B) comprises:

recording at least one photo by means of a camera, and/or
recording at least one sound recording by means of a microphone; and/or
outputting at least one acoustic signal.

The attendance recording terminal or the control unit is preferably configured in such manner that an illumination value of a display of the attendance recording terminal is increased for recording the photo.

When increasing the display brightness, a brief increase above the maximum value is also possible.

Furthermore, it is preferred if the recorded image and/or audio material is relayed, for example to a server. This can be used to back up data about the sabotage attempt, as well as to inform other people directly, for example in the company such as a security service.

When executing the protective functions mentioned, it is also possible that the camera (for recording the photo), the microphone (for recording the sound recording) and/or a loudspeaker for outputting an acoustic signal is either integrated into the attendance recording terminal or is designed separately and communicates with the attendance recording terminal directly (in a wired or wireless manner) or communicates with a server that is communicatively connected to the attendance recording terminal.

According to a further embodiment of the computer-implemented method for operating an attendance recording terminal, it is proposed that the protective function in method step c) comprises sending at least one warning message. The warning message can be sent to a server in particular via a communication connection, preferably an Internet connection. In this way, relevant persons can advantageously be informed immediately about the sabotage attempt (e.g. a security service).

Alternatively or additionally, as part of the computer-implemented method for operating an attendance recording terminal, it can be provided that the protective function in method step c) comprises deleting sensitive data that is stored in the attendance recording terminal. This can particularly advantageously comprise deleting all locally stored data of the attendance recording terminal. In this way, negative consequences of the sabotage attempt can be reduced to the extent that no sensitive data can be stolen or it is less easy to intercept.

Alternatively or additionally, as part of the computer-implemented method for operating an attendance recording terminal, it can be provided that the protective function in method step c) comprises switching off the attendance recording terminal. In this case, in particular, a power connection can be interrupted. In this way, negative consequences of the sabotage attempt can be advantageously reduced, because the sabotaging person no longer has the opportunity to work with the terminal as desired or to carry out acts of sabotage such as data manipulation, for example.

According to a further embodiment of the attendance recording terminal, it is proposed that the control unit be configured in such manner that the protective function in step B) comprises sending at least one warning message. The warning message can be sent to a server in particular via a communication connection, preferably an Internet connection. In this way, relevant persons can advantageously be informed immediately about the sabotage attempt (e.g. a security service).

Alternatively or additionally, the control unit of the attendance recording terminal can be configured in such manner that the protective function in method step c) comprises deleting sensitive data that is stored in the attendance recording terminal (10). This can particularly advantageously comprise deleting all locally stored data of the attendance recording terminal. In this way, negative consequences of the sabotage attempt can be reduced to the extent that no sensitive data can be stolen or it is less easy to intercept.

Alternatively or additionally, the control unit of the attendance recording terminal can be configured in such manner that the protective function in method step c) comprises switching off the attendance recording terminal. In this case, in particular, a power connection can be interrupted. In this way, negative consequences of the sabotage attempt can be advantageously reduced, because the sabotaging person no longer has the opportunity to work with the terminal as desired or to carry out acts of sabotage such as data manipulation, for example.

Furthermore, the advantage is achieved by providing a computer program, which computer program comprises commands which, when the program is executed by a processor of an attendance recording terminal, causes the attendance recording terminal to perform the steps of the proposed method described above or below.

Furthermore, a computer-readable medium is proposed, on which the aforementioned computer program is stored.

BRIEF DESCRIPTION OF THE DRAWINGS

Further advantageous and preferred configurations emerge from the following description with reference to the figures. In the drawings, which only show exemplary embodiments.

DETAILED DESCRIPTION OF THE DRAWINGS

Figure 1:
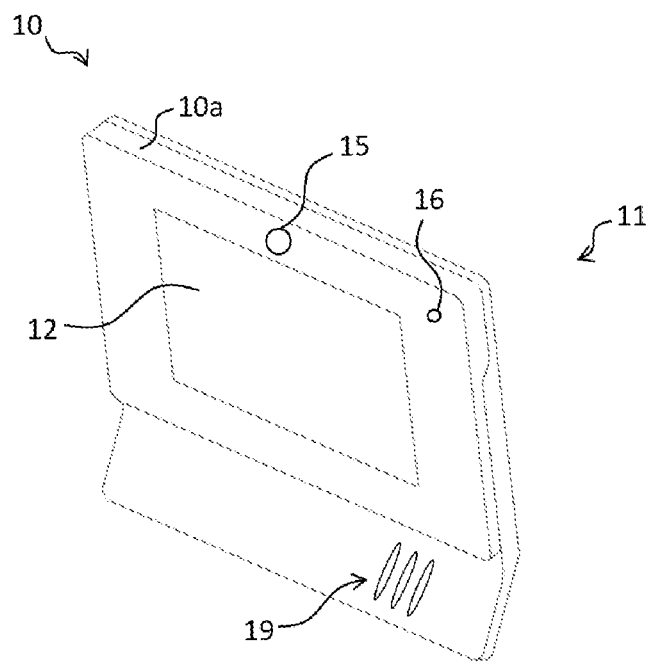
FIG. 1 shows a perspective view of an exemplary embodiment of the proposed attendance recording terminal.

An attendance recording terminal 10 is represented schematically in FIG. 1. The attendance recording terminal 10 is used to record attendance information of a person 50 (see FIGS. 3 and 4) on the basis of an action of this person 50. The represented attendance recording terminal 10 can be positioned in office buildings, factory buildings or hospitals, for example, so that a system is provided there which allows electronic recording and storage of employee attendances. The attendance recording terminal 10 can be designed as a time recording terminal and can thus also be used to record and store the working hours completed by employees. In general, in this context, the attendance information of a person 50 is mentioned, which person would like to clock in for work via the attendance recording terminal 10 or, for example, log out for a break or at the end of the working day or clock out of the system.

Figure 2:
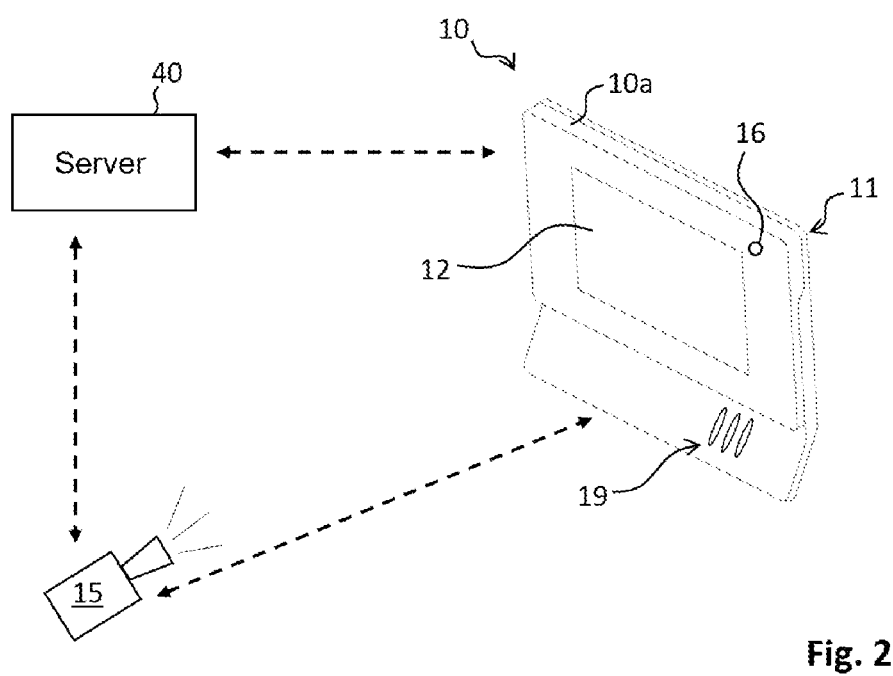
FIG. 2 shows a perspective view of a further exemplary embodiment of the proposed attendance recording terminal with surrounding components.

The attendance recording terminal 10 can be mounted on a wall, for example, via its rear connection structure 11 that is covered in FIGS. 1 and 2 by the front side of the attendance recording terminal 10. A point for interaction for the people 50 can then be provided centrally, for example at a point in the entrance area of an office building or also on each floor or in each department of a building or company, whereby the desired clocking processes can be implemented in a simple manner. A central system is then available to the employer, for example via a memory management unit 20 of the attendance recording terminal 10, via which the employer can track the attendance information of the individuals without significant effort (see also FIG. 3). That memory management unit 20 can be an integral part of the attendance recording terminal 10 or it can also be provided externally, for example on a server 40 as indicated in FIG. 2 (see also FIG. 3). The necessary exchange of information can then take place via a communication connection (in a wired or wireless manner) between an integrated control unit 21 of the attendance recording terminal 10 (FIG. 3) and the server 40, i.e. for example the clocking processes of the employees can be communicated and then stored in the memory management unit 20 on the server 40. That communication connection (in a wired or wireless manner) is indicated in FIGS. 2 and 3 by dashed double arrows between the components.

Figure 3:
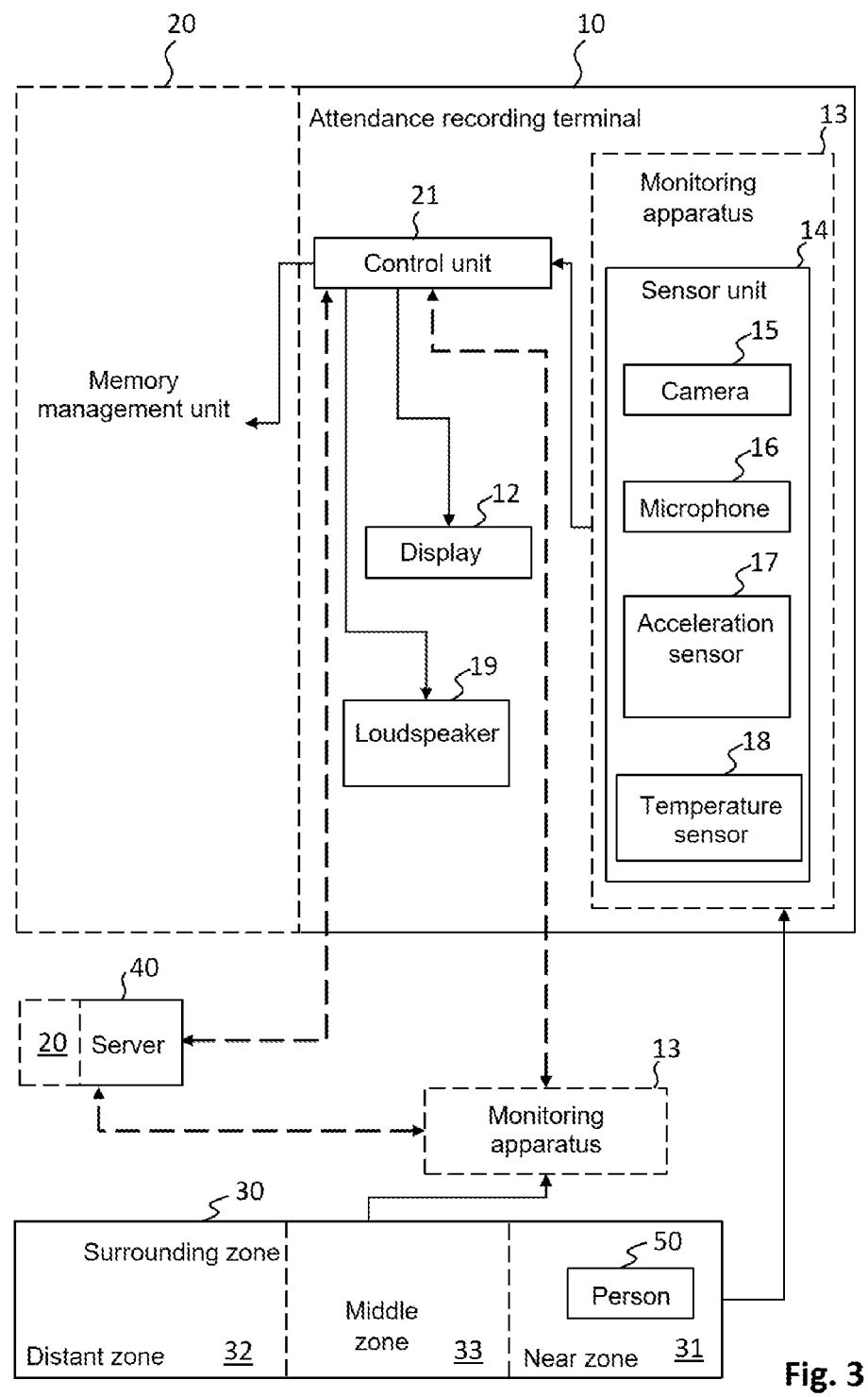
FIG. 3 shows a schematic configuration of an exemplary embodiment of a proposed attendance recording terminal.

In FIG. 3, which shows a schematic configuration of an exemplary embodiment of the proposed attendance recording terminal 10, the memory management unit 20 is indicated in dashed lines, once as an integral part of the attendance recording terminal 10 and again as part of the server 40. In one embodiment, the memory management unit 20 can be implemented only in the attendance recording terminal 10 (integrated in a common housing 10*a*) or only on the server 40, or also at least partially implemented both in the attendance recording terminal 10 and on the server 40.

As can be seen in FIGS. 1 and 2, the attendance recording terminal 10 has a display 12 on the front, which is used to display information for interacting people 50. Designed with a touchscreen function, for example, the display 12 can also be used directly for the interaction of the person 50. After the action has taken place, for example after a clocking process has been carried out, the person 50 can also be shown feedback about the clocking process or an error message via the display 12.

In addition, the attendance recording terminal 10 comprises a monitoring apparatus 13, by means of which an external physical influence on the attendance recording terminal 10 can be recorded. Such a physical external influence can, for example, be an external force application, for example when a person 50 tries to gain unauthorized access to the attendance recording terminal 10 from the outside and sabotage the terminal. The external influence could also be an influence that mechanically stresses or potentially damages the structure, such as heat. Likewise, the physical external influence could be in the form that the software of the attendance recording terminal 10 is attacked or is attempted to be sabotaged. In principle, acts of sabotage can occur as hardware sabotage and/or software sabotage. The acts of sabotage, the negative consequences of which for the attendance recording terminal 10 or its operator are intended to be reduced with the aid of the present disclosure, are regularly associated with an intervention on the interior of the attendance recording terminal 10. Be it to gain access to sensitive data or to sabotage them, or else to damage or even destroy the attendance recording terminal 10 by means of an external force.

The monitoring apparatus 13 is designed as a sensor unit 14. In principle, a surrounding zone 30 around the attendance recording terminal 10 (see FIG. 4) is monitored by means of the sensor unit 14. Data that is representative of the external physical influence to be detected is recorded via the monitoring by means of the sensor unit 14. The monitoring apparatus 13 or the sensor unit 14 therefore supplies the attendance recording terminal 10 with data from the surrounding zone 30 (as indicated by solid arrows in FIG. 3). In this case, the sensor unit 14 can be designed in several parts, for example only by means of a sensor, or also in several parts.

In the exemplary embodiment of FIG. 1, which is represented and preferred in this respect, the monitoring apparatus 13 is formed by the two components, camera 15 and microphone 16, integrated into the attendance recording terminal 10. The monitoring apparatus 13 could also have other components, such as an acceleration sensor 17 or a temperature sensor 18 (see FIG. 3), or also a plurality of cameras 15 and/or a plurality of microphones 16. As can be seen from FIG. 1, both the camera 15 and the microphone 16 are physical components of the attendance recording terminal 10.

An alternative embodiment to the attendance recording terminal 10 represented in FIG. 1 is shown in FIG. 2, wherein, in the represented attendance recording terminal 10, the monitoring apparatus 13 is arranged partially outside of the attendance recording terminal 10. The camera 15 is not a physical component of the attendance recording terminal 10 in FIG. 2, in the sense that it would be arranged together with the other components, such as the display 12 etc., in a common housing 10*a*. Rather, the camera 15 in FIG. 2 is arranged externally and is connected to the attendance recording terminal 10 itself or for example also to a server 40 (either in a wired or wireless manner) via a communication connection—indicated by a dashed double arrow. In the exemplary embodiment according to FIG. 2, the sensor unit 14 or the monitoring apparatus 13 is implemented at least partially via a third-party device. That third-party device is communicatively connected to the attendance recording terminal 10 (in a wired or wireless manner).

The further component of the monitoring apparatus 13 of the attendance recording terminal 10 according to FIG. 2 in the form of the microphone 16 is in turn integrated into the attendance recording terminal 10, i.e. arranged in the common housing 10*a*. Here, too, it is possible for further components or just one component, for example only the externally arranged camera 15, to form the monitoring apparatus 13 of the attendance recording terminal 10.

The attendance recording terminal 10 has a loudspeaker 19 both in the exemplary embodiment according to FIG. 1 and according to FIG. 2. Predefined information can be output via the loudspeaker 19 to people interacting with the attendance recording terminal 10. Furthermore, however, the loudspeaker 19 can also be used to the effect that a protective function is carried out via the loudspeaker 19 in the event of acts of sabotage. For example, if an act of sabotage is detected, an acoustic signal, for example a loud warning signal, can be output via the loudspeaker 19.

On the basis of the configuration of the attendance recording terminal 10 represented in FIG. 3, it is discernible how this attendance recording terminal interacts with its surroundings. As explained above, the attendance recording terminal 10 either has a memory management unit 20 as an integral physical component (indicated above in FIG. 3 via the box marked with dashed lines with reference numeral 20) or the memory management unit 20 is integrated into the external server 40 (indicated bottom left in FIG. 3). Likewise, the memory management unit 20 can be partially physically embedded in the attendance recording terminal 10 (integrated into the common housing 10*a*), and at the same time partially implemented on the server 40.

The attendance information of interacting people 50 is stored as intended in the memory management unit 20. Sensitive data, in particular personal data, are therefore partially stored in the memory management unit 20. The data can therefore be stored locally via the integration of the memory management unit 20 in the attendance recording terminal 10, or the data can be stored externally, for example online, in the memory management unit 20 implemented on the server 40.

The attendance recording terminal 10 also comprises the control unit 21. On the one hand, the storage processes are controlled via the control unit 21 as intended, i.e. either the attendance information of people 50 is stored or processed. On the other hand, the presence of an act of sabotage is initially determined with the aid of the control unit 21, and then the protective function as proposed and described in more detail later is carried out in the event of an identified act of sabotage. For this purpose, the control unit 21 receives information from the monitoring apparatus 13, on the one hand. On the other hand, the control unit 21 can control the display 12 or the loudspeaker 19, for example. This is indicated by the solid arrows in FIG. 3.

Furthermore, the attendance recording terminal 10 has the monitoring apparatus 13, which, as can be seen in FIG. 3, comprises the sensor unit 14, for the purpose of detecting physical external influences and thus for the purpose of identifying an act of sabotage. As previously described in connection with FIGS. 1 and 2, the sensor unit 14 has the camera 15 and the microphone 16. Furthermore, the sensor unit 21 has the acceleration sensor 17 and the temperature sensor 18 according to the represented exemplary embodiment of FIG. 3.

Acceleration sensor signals are detected via the acceleration sensor 17, which are representative of the force applications caused, for example, by external impacts and/or kicks against the attendance recording terminal 10.

The temperature is detected via the temperature sensor 18, which can also be representative of a sabotage attempt, for example if a fire is started or work is carried out on the attendance recording terminal 10 using tools that cause heat.

Even if both an external monitoring apparatus 13 and a monitoring apparatus 13 integrated into the attendance recording terminal 10, i.e. into the common housing 10*a* (see FIGS. 1 and 2), are provided in the exemplary embodiment according to FIG. 3, only one of the two represented monitoring apparatuses 13 can be implemented.

The one or plurality of monitoring apparatus(es) 13 or the one or plurality of sensor unit(s) 14 specifically monitor the surrounding zone 30, i.e. receive information about what is happening in the surrounding zone 30, i.e. receive corresponding data, as indicated by the solid arrow. In this case, the surrounding zone 30 can in turn be divided into a plurality of sub-zones, as can be seen in FIG. 3 and an example of an arrangement of an attendance recording terminal 10 in a corridor 300 also in FIG. 4. Thus, a near zone 31, which is arranged closest to the attendance recording terminal 10, and a distant zone 32, which is arranged furthest away from the attendance recording terminal 10, are provided. Between the near zone 31 and the distant zone 32 there is a middle zone 33.

Figure 4:
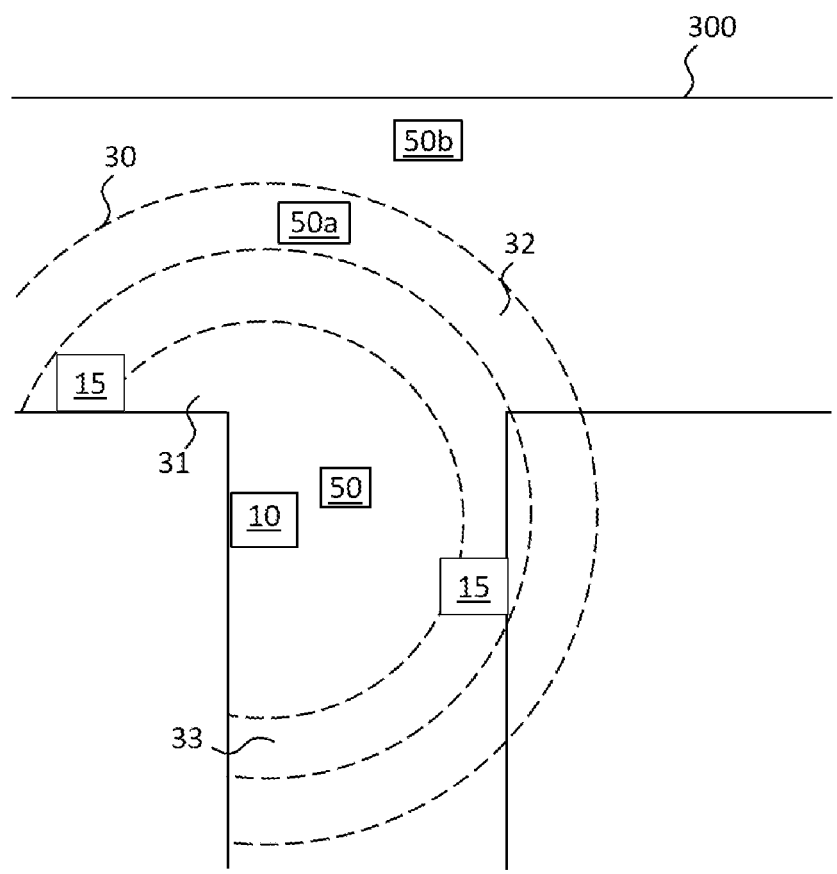
FIG. 4 shows a schematic plan view of an arrangement of a proposed attendance recording terminal in a corridor with surrounding components and people.

Advantageously, the monitoring apparatus 13 used, which in the exemplary embodiment of FIG. 4 is configured via the two cameras 15 mounted at different locations on the wall, can specifically detect in which sub-zone 31, 32, 33 the person 50, 50*a* is located. Zone-specific signals are therefore detected which emanate from the person 50 in the near zone 31 or from the person 50*a* in the distant zone 32.

In this case, the zone-specific signal does not have to be actively triggered by the person 50 or 50*a*. Rather, the zone-specific signal is merely caused by the person 50 or 50*a*, for example by the presence or by the type of advancing movement of the person 50 or 50*a* in the respective sub-zone. For example, a person 50 or 50*a* in the sub-zone or their movement can be tracked via camera tracking and a zone-specific signal can be generated from this. The zone-specific signal can thus be effected or caused by the simple presence or the movement of the person 50 or 50*a* in the sub-zone.

The following circumstances can be included in the zone-specific signal:
in which sub-zone the person 50 or 50*a* is located, and/or
which sub-zone the person 50 or 50*a* is entering, and/or
what does a movement pattern of the person 50 or 50*a* look like?

The movement pattern of the person 50 or 50*a* can relate to a movement direction of the person 50 or 50*a* and/or a movement speed of the person 50 or 50*a*. The movement direction can be represented by a direction vector over time. The movement pattern of the person 50 or 50*a* within a surrounding zone 30 or sub-zone can be detected and, for example, the analysis of the intention of the 10 interaction of the person 50 or 50*a* can also be used as a basis. Using the information regarding the sub-zone which a person 50 or 50*a* is entering, a change of zone by a person 50 or 50*a* can be detected and can be used as a basis for the analysis. Analysis of the movement data can also be used to identify possible acts of sabotage.

The attendance recording terminal 10 can also advantageously be switched to different operating modes by training and observing movements in the different sub-zones. For example, waking up from an energy-saving sleep mode can take place depending on the sub-zone in which the person 50 or 50*a* is located or the manner in which the person 50 or 50*a* moves around in a sub-zone. For example, if the person 50 or 50*a* only enters the distant zone 32 and is basically detected there, but that person 50 or 50*a* does not approach the attendance recording terminal 10 any further and therefore does not enter the middle zone 33 or the near zone 31, it can be concluded that the person 50 or 50*a* does not want to interact with the attendance recording terminal 10 at all. Then the attendance recording terminal 10 can be operated particularly sparingly.

The example shown in FIG. 3 of a corridor 300 having a T-junction illustrates the different sub-zones, represented by dashed partial circles, surrounding the attendance recording terminal 10 at different distances. The person 50 who is located in the near zone 31 interacts with the attendance recording terminal 10. The person 50*a*, in turn, is in the distant zone 32, in which a basic detection of the person 50*a* takes place by means of the cameras 15 of the attendance recording terminal 10, but this would not lead to an interaction of the person 50*a* being expected or, for example, to the actions being analyzed with regard to potential sabotage. Only when the person 50*a* also enters the middle zone 33 or, depending on the desired configuration, the near zone 31, is the more specific monitoring likewise activated. The third person 50*b*, in turn, is located outside the entire surrounding zone 30, so that in relation to the person 50*b*, said person 50*b* is not detected at all. The attendance recording terminal 10 does not detect the person 50*b* in the represented configuration, since it is clear that no interaction with the attendance recording terminal 10 is desired by the person 50*b* or since no sabotage is to be expected from that far distance.

Figure 5:
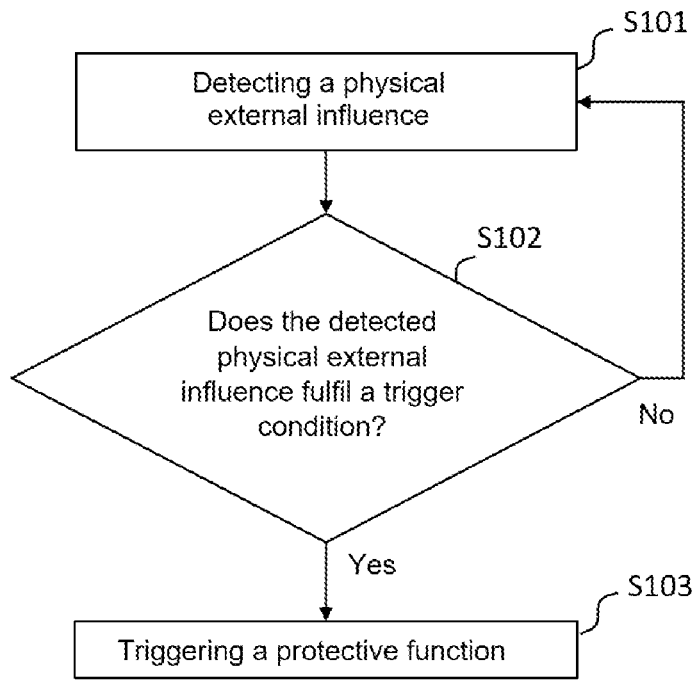
FIG. 5 shows a flow chart of the method steps of a proposed computer-implemented method for operating an attendance recording terminal.

FIG. 5 represents an exemplary embodiment of the proposed method for the protected operation of the attendance recording terminal 10, as a result of which the negative effects of a sabotage attempt are minimized. In this context, as part of step S101, a physical external influence on the attendance recording terminal 10 is first detected. The external physical influence can be, for example, a temperature that prevails in the immediate vicinity of the attendance recording terminal 10. However, it can also be an external force application. In this step, the data caused by the acts of sabotage described above are to be detected, i.e. for example an increased temperature, a vibration, or for example an unusual movement pattern of a person 50, 50*a*, 50*b*, which could be detected by camera tracking (see corridor in FIG. 4).

In method step S102, it is then checked as to whether or not the external physical influence acting on the attendance recording terminal 10 externally and previously detected fulfills a predefined trigger condition. If the trigger condition is fulfilled, at least one protective function is triggered in step S103. If the external physical influence is of an unusual nature, it can be concluded to be an undesired act of sabotage and the execution of a specific protective function may be desirable.

In summary, the proposed computer-implemented method for the protected operation of the attendance recording terminal 10 takes place via the following three steps:
a) detecting a physical external influence on the attendance recording terminal 10;
b) checking whether the physical external influence fulfills a predefined trigger condition; and
c) triggering at least one protective function if the check results in the external physical influence fulfilling the trigger condition.

Figure 6:
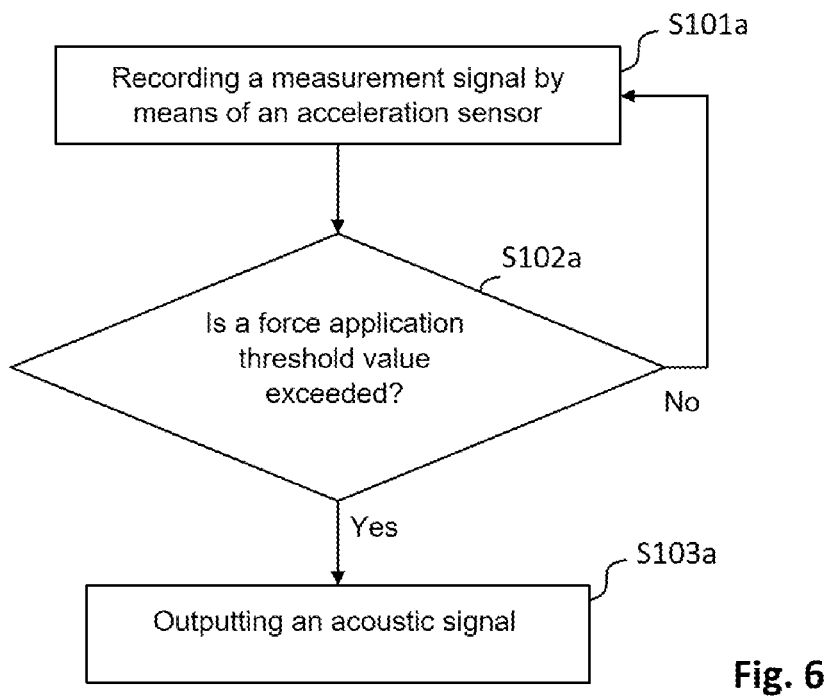
FIG. 6 shows a flow chart of the method steps of a further exemplary embodiment of a proposed computer-implemented method for operating an attendance recording terminal.

A specific example of the proposed method is represented in FIG. 6, wherein step S101 generally described above is implemented in such manner that a measurement signal is recorded by means of an acceleration sensor 17 (see FIG. 3) as part of step S101a. In the corresponding method, the external physical influence is therefore detected in the aforementioned method step a) by means of the acceleration sensor 17, wherein a detected and recorded acceleration sensor signal is compared (step S102a in FIG. 6) with a predefined force application threshold value during the checking according to method step b) (previously step S102 in FIG. 5). The acceleration sensor 17 works with different strengths depending on the strength of a vibration that the attendance recording terminal 10 experiences. Accordingly, a force application threshold value can be predefined up to which vibrations are still considered normal and permissible. If, however, the external physical influence exceeds that force application threshold value, an unusual force application is assumed, which can be representative of an act of sabotage. A protective function is then triggered (previously method step c)), wherein, in the case represented in FIG. 6, this involves the output of an acoustic signal in the form of a warning tone (step S103a). That acoustic signal, for example output via the loudspeaker 19 of the attendance recording terminal 10 (see FIGS. 1 to 3), serves to deter the sabotaging person or to warn or notify surrounding or nearby persons of the sabotage attempt.

Figure 7:
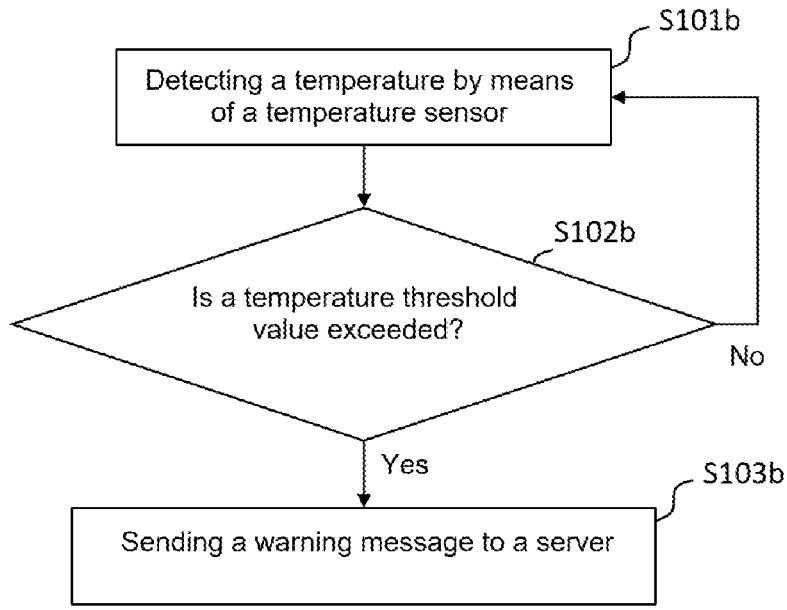
FIG. 7 shows a flow chart of the method steps of a further exemplary embodiment of a proposed computer-implemented method for operating an attendance recording terminal.

Another specific example of the proposed method is represented in FIG. 7, wherein step S101 generally described above is implemented in such manner that a temperature is recorded by means of a temperature sensor 18 (see FIG. 3) as part of step S101b. In the corresponding method, the external physical influence is therefore detected in the aforementioned method step a) by means of the temperature sensor 18, wherein a detected temperature is compared with a temperature threshold value (step S102b in FIG. 7) during the checking according to method step b) (previously step S102 in FIG. 5).

In this case, it can be particularly advantageous for the temperature threshold value to be determined as a function of an ambient temperature. For example, on hot days when the ambient temperature is high, the temperature threshold value can be adjusted upwards and vice versa. Here, either a detected ambient temperature can be included (via an additional thermometer) or a temperature stored in the system, for example by establishing an online connection to a weather service and using this to call up the ambient temperature. It can also be implemented as a safety function that the temperature sensor 18 can be switched off, for example on warm days, in order to avoid misinterpretations of supposed acts of sabotage.

In principle, a temperature threshold value can be predefined up to which detected temperatures are still considered normal. However, if the external physical influence exceeds that temperature threshold value, an unusual temperature is assumed, which can be representative of an act of sabotage. A protective function is then triggered (previously method step c)), wherein, in the case represented in FIG. 7, this involves the sending of a warning message to a server 40 (step S103b). It is advantageous if the warning message is sent to the server 40 via a communication connection such as an Internet connection. People in the company can then be informed immediately about the attempted act of sabotage and can initiate countermeasures.

Figure 8:
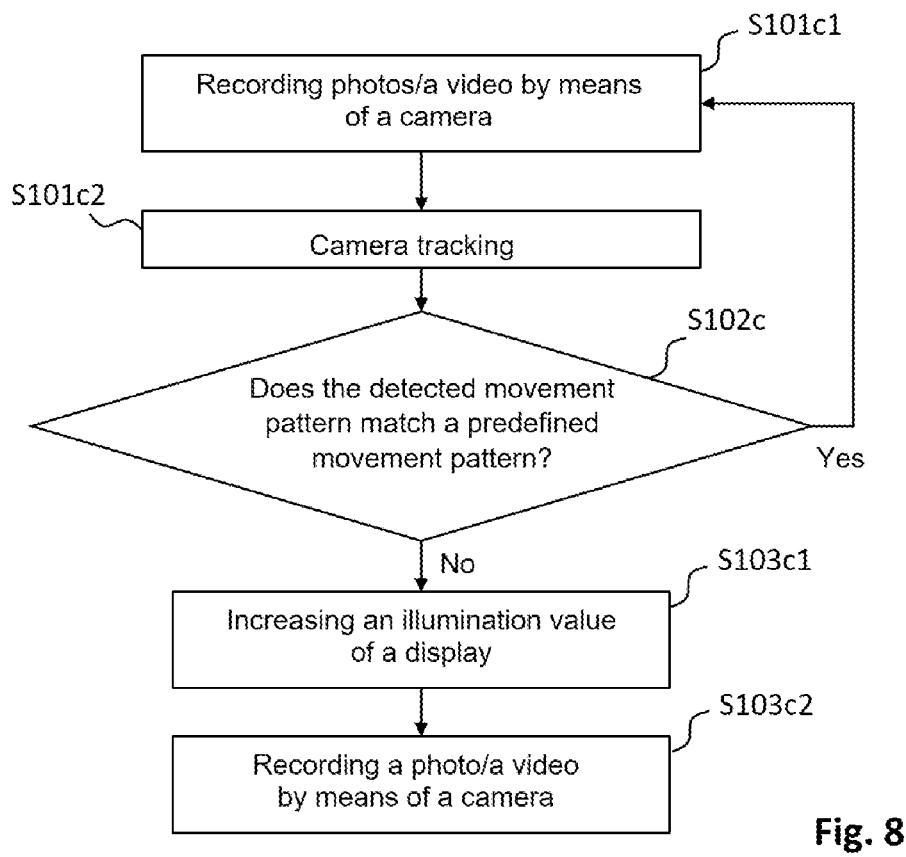
FIG. 8 shows a flow chart of the method steps of a further exemplary embodiment of a proposed computer-implemented method for operating an attendance recording terminal.

According to a further exemplary embodiment of the proposed method represented in FIG. 8, the external physical influence is detected in method step a) (see step S101 in FIG. 5) by means of at least one camera 15. For this purpose, photos are first recorded by means of the camera 15, or for example also a video (partial step S101c1), whereupon camera tracking takes place as part of the partial step S101c2. Accordingly, during the detection according to method step a), the camera tracking takes place and a detected movement pattern of a person 50 or 50a interacting with the attendance recording terminal 10 is compared with a predefined movement pattern.

As part of method step b) of comparing with a trigger condition (see step S102 in FIG. 5), the detected movement pattern is thus compared with predefined movement patterns in the method according to FIG. 8 (step S102c in FIG. 8). Those predefined movement patterns could also be stored specifically for individual interacting persons 50 or 50a and stored either locally or on the server 40 in the memory management unit 20 of the attendance recording terminal 10.

If this check of the trigger condition shows that a corresponding movement pattern is present and predefined, then the conclusion can be drawn that there is no unusual movement and therefore no act of sabotage is to be expected. However, if no corresponding movement pattern is stored, then a conclusion can be drawn as to a potential act of sabotage. As a result, the protective function (method step c); see step S103 in FIG. 5) according to the exemplary embodiment of FIG. 8 is triggered in such manner that an illumination value of the display 12 of the attendance recording terminal 10 is first increased (partial step S103c1) and then a photo or even a video is recorded by means of the camera 15 (partial step S103c2).

Increasing the display brightness ensures that as much as possible can be seen in a photo that has been recorded. This is particularly advantageous since sabotage attempts occur primarily at night or in the dark. When increasing the display brightness, a brief increase in display brightness above MAX is also possible.

The protective functions described above or below can also be implemented in combination, i.e. triggered together if the trigger condition is fulfilled, or depending on the type of trigger condition that is fulfilled, a specific protective function, while another protective function is triggered when a different type of trigger condition is fulfilled.

An alternative protective function according to method step c) can include, for example, of at least one sound being recorded by means of the microphone 16. In concrete terms, the protective functions can also run in several parts or staggered in time. It is conceivable that an image (or video) recorded as part of the protective function and possibly additionally or alternatively also a sound recording are relayed in a subsequent step, i.e. sent to predefined recipients and/or the server 40. Then people are informed with specific information in the form of image and/or audio material about the attempted alleged act of sabotage and can better assess it before countermeasures are taken.

Other protective functions that are conceivable within the scope of method step c) are:

deleting sensitive data stored in the attendance recording terminal 10 or in the memory management unit 20, whether locally in the attendance recording terminal 10 or online, for example on the server 40, and/or switching off the attendance recording terminal 10, wherein in particular a power connection is interrupted.

When deleting the data, it is particularly advantageous if at least all of the locally stored data of the attendance recording terminal 10 is deleted.

Another physical external influence can also be the entry of a personal PIN by the user of the terminal, for example to be able to carry out a clocking process. It can then be defined as a trigger condition that a PIN must not be entered incorrectly three times. As a protective function, if the trigger condition is fulfilled, i.e. if the PIN has been entered incorrectly three times, then the specific user can be blocked.

It is particularly advantageous if method steps a) to c) (steps S101 to S103 in FIG. 5 or steps S101a to S103a in FIG. 6 or steps S101b to S103b in FIG. 7 or steps S101c1 to S103c2 in FIG. 8) only take place during at least one predefined period of time. For example, the proposed measures to prevent potential damage from sabotage can also only take place outside of working hours and/or only at night if acts of sabotage are suspected and occur more frequently. In this way, the terminal can advantageously be operated in a more energy-saving manner.

The invention claimed is:

1. A computer-implemented method for the protected operation of an attendance recording terminal, for recording attendance information of a person on the basis of an action of the person, the method including the following steps:
   a) detecting a physical external influence on the attendance recording terminal;
   b) checking whether the physical external influence fulfills a predefined trigger condition;
   c) triggering at least one protective function if the check results in the external physical influence fulfilling the trigger condition,
      wherein the protective function in method step c) comprises:
      recording at least one photo by a camera,
         wherein an illumination value of a display of the attendance recording terminal is increased for recording the photo;
      and/or
      recording at least one sound recording by a microphone.

2. The computer-implemented method according to claim 1, wherein the method steps a) to c) only take place during at least one predefined period of time.

3. The computer-implemented method according to claim 1, wherein the external physical influence is detected in method step a) by at least one acceleration sensor,
   wherein during the checking according to method step b), a detected acceleration sensor signal is compared with a predefined force application threshold value.

4. The computer-implemented method according to claim 1, wherein the physical external influence is detected in method step a) by at least one temperature sensor,
   wherein during the checking according to method step b), a detected temperature is compared with a temperature threshold value,
   wherein the temperature threshold value is determined as a function of an ambient temperature.

5. The computer-implemented method according to claim 1, wherein the external physical influence is detected in method step a) by at least one camera,
   wherein during the detection according to method step a), camera tracking takes place and a detected movement pattern of a person interacting with the attendance recording terminal is compared with a predefined movement pattern.

6. The computer-implemented method according to claim 1, wherein the protective function in method step c) comprises:
   outputting at least one acoustic signal.

7. The computer-implemented method according to claim 1, wherein the protective function in method step c) comprises:
   sending at least one warning message,
      wherein the warning message is sent to a server via a communication connection;
   and/or
   deleting sensitive data stored in the attendance recording terminal,
      deleting all locally stored data of the attendance recording terminal;
   and/or
   switching off the attendance recording terminal,
      wherein a power connection is interrupted.

8. An attendance recording terminal for recording attendance information of a person on the basis of an action of the person, the attendance recording terminal comprising:
   a control unit; and
   a monitoring apparatus for detecting a physical external influence on the attendance recording terminal;
      wherein the control unit is configured such that:
      A) a physical external influence detected by the monitoring apparatus is checked to determine whether it fulfills a predefined trigger condition; and
      B) at least one protective function is triggered if the check in step A) results in the detected external physical influence fulfilling the trigger condition,
   wherein the control unit is configured such that the protective function in step B) comprises:
   recording at least one photo by a camera,
      wherein an illumination value of a display of the attendance recording terminal is increased for recording the photo;
   and/or
   recording at least one sound recording by a microphone;
   and/or
   outputting at least one acoustic signal.

9. The attendance recording terminal according to claim 8, wherein the monitoring apparatus is configured such that the detection of the external physical influence only takes place during at least one predefined period of time;
   and/or
   wherein the control unit is configured such that steps A) and B) only take place during at least one predefined period of time.

10. The attendance recording terminal according to claim 8, wherein the monitoring apparatus has at least one acceleration sensor for detecting the physical external influence, wherein during the checking according to step A), a detected acceleration sensor signal is compared with a predefined force application threshold value.

11. The attendance recording terminal according to claim 8, wherein the monitoring apparatus has at least one temperature sensor for detecting the physical external influence,
wherein during the checking according to step A), a detected temperature is compared with a temperature threshold value,
wherein the temperature threshold value is determined as a function of an ambient temperature.

12. The attendance recording terminal according to claim 8, wherein the monitoring apparatus has at least one camera for detecting the physical external influence,
wherein during the checking according to step A), camera tracking takes place and a detected movement pattern of a person interacting with the attendance recording terminal is compared with a predefined movement pattern.

13. The attendance recording terminal according to claim 8, wherein the control unit is configured such that the protective function in step B) comprises:
sending at least one warning message,
wherein the warning message is sent to a server via a communication connection;
and/or
deleting sensitive data stored in the attendance recording terminal,
and/or
switching off the attendance recording terminal, wherein a power supply is interrupted.

14. A computer program comprising commands which, when the program is executed by a processor of an attendance recording terminal, causes the attendance recording terminal to perform the steps of the method according to claim 1.

15. An attendance recording terminal for recording attendance information of a person on the basis of an action of the person, the attendance recording terminal comprising:
a control unit; and
a monitoring apparatus for detecting a physical external influence on the attendance recording terminal;
wherein the control unit is configured such that:
A) a physical external influence detected by the monitoring apparatus is checked to determine whether it fulfills a predefined trigger condition; and
B) at least one protective function is triggered if the check in step A) results in the detected external physical influence fulfilling the trigger condition,
wherein the control unit is configured such that the protective function in step B) comprises:
sending at least one warning message,
wherein the warning message is sent to a server via a communication connection;
and/or
deleting sensitive data stored in the attendance recording terminal;
and/or
switching off the attendance recording terminal, wherein a power supply is interrupted.

16. The attendance recording terminal according to claim 15, wherein the monitoring apparatus is configured such that the detection of the external physical influence only takes place during at least one predefined period of time;
and/or wherein the control unit is configured such that steps A) and B) only take place during at least one predefined period of time.

17. The attendance recording terminal according to claim 15, wherein the monitoring apparatus has at least one acceleration sensor for detecting the physical external influence, wherein during the checking according to step A), a detected acceleration sensor signal is compared with a predefined force application threshold value.

18. The attendance recording terminal according to claim 15, wherein the monitoring apparatus has at least one temperature sensor for detecting the physical external influence,
wherein during the checking according to step A), a detected temperature is compared with a temperature threshold value,
wherein the temperature threshold value is determined as a function of an ambient temperature.

19. The attendance recording terminal according to claim 15, wherein the monitoring apparatus has at least one camera for detecting the physical external influence, wherein during the checking according to step A), camera tracking takes place and a detected movement pattern of a person interacting with the attendance recording terminal is compared with a predefined movement pattern.

* * * * *